United States Patent Office 3,003,719
Patented Oct. 10, 1961

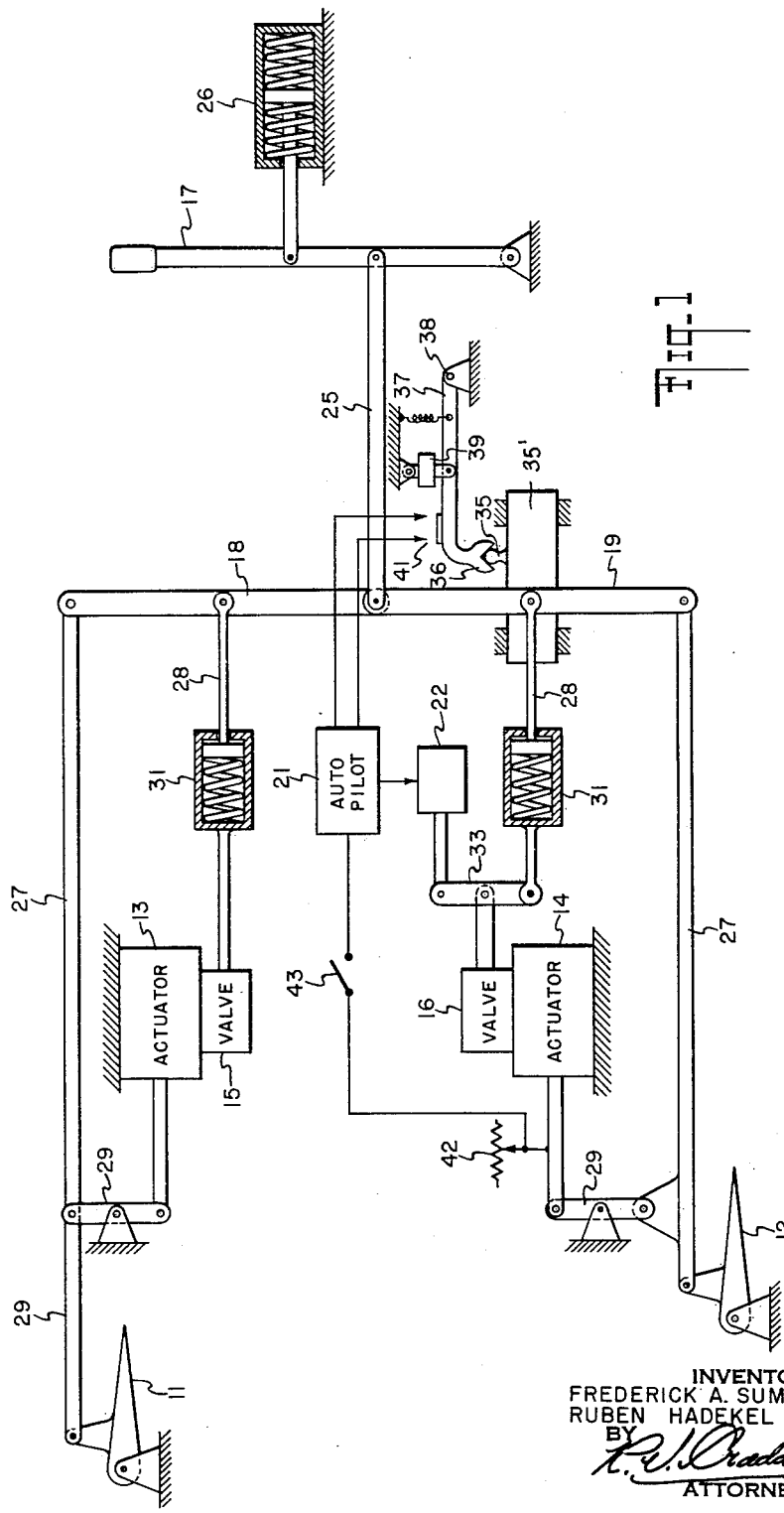

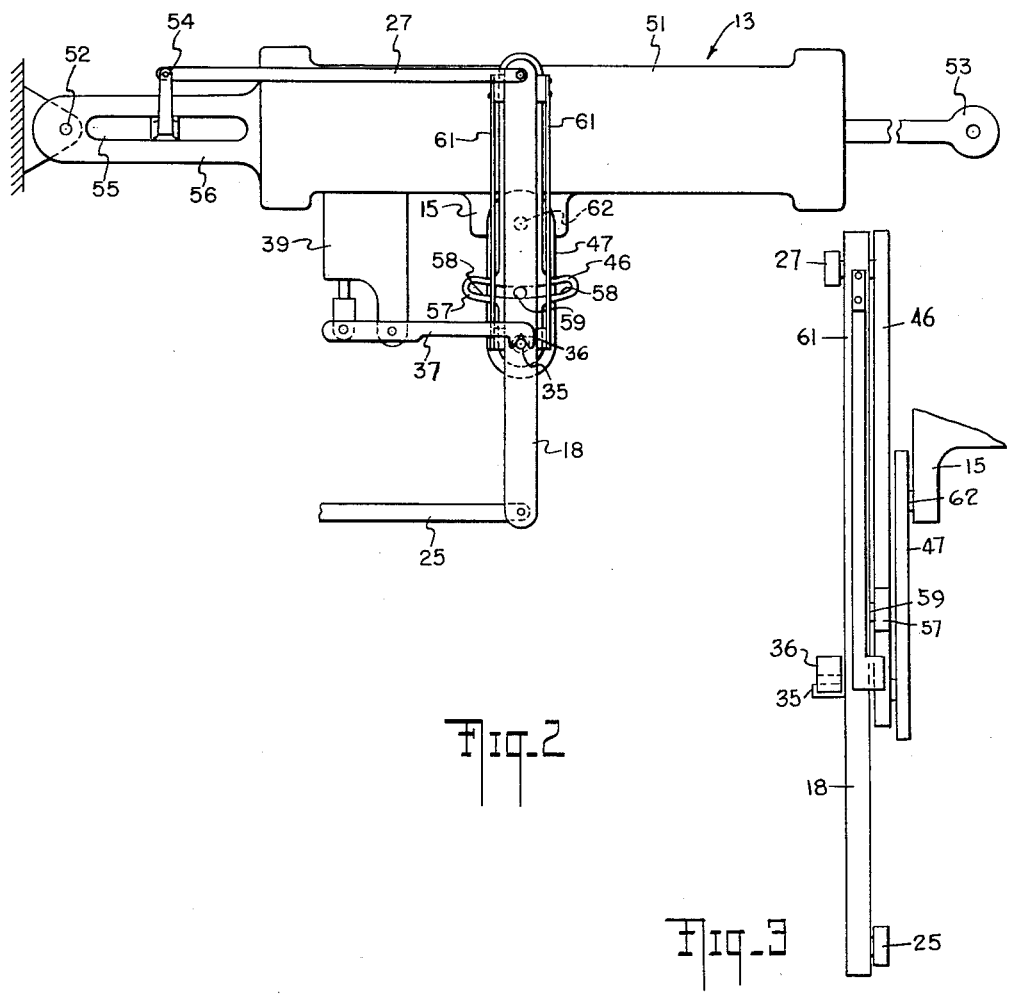

3,003,719
CONTROL APPARATUS FOR AIRCRAFT
Frederick Arthur Summerlin, Isleworth, and Ruben Hadekel, London, England, assignors to The Sperry Gyroscope Company Limited, Brentford, England, a British company
Filed Sept. 15, 1958, Ser. No. 761,006
Claims priority, application Great Britain Sept. 27, 1957
9 Claims. (Cl. 244—76)

This invention relates to control apparatus for an aircraft having a control surface in a number of independently movable portions, and one object is to provide an economical means of automatic pilot control of such a control surface.

According to the present invention control apparatus for an aircraft having a control surface in a number of independently movable portions includes a main actuator for moving each portion of the control surface, an auxiliary actuator arranged, in an automatic mode of operation, to operate one only of the main actuators automatically in response to signals from an instrument, and a connection from the output of the one main actuator arranged during the automatic mode of operation to cause corresponding operation of the other main actuators.

According to a second aspect of the invention control apparatus for an aircraft having a control surface in a number of independently movable portions including a main actuator for moving each portion of the control surface, a single manual controller arranged to operate all the main actuators, an auxiliary actuator arranged, in an automatic mode of operation, to operate one only of the main actuators automatically in response to signals from an instrument, and a feed-back connection from the output of the one main actuator arranged during the automatic mode of operation to move the manual controller to the position corresponding with the position of the one main actuator if it is not already in that corresponding position.

The apparatus can also have a powered-manual mode of operaiton, and also a direct manual mode.

It is clear that it is simpler to use instrument—e.g. automatic pilot-control of one portion of the control surface only, then to control all the portions in response to the instrument signals: and the feed-back connection renders this "single control" sufficient because the consequent movement of the manual controller effects the movement of the other portions of the control surface.

Preferably each main actuator is arranged to be operated from the output of a differential link of which the inputs are connected respectively to the manual controller and the output from the main actuator concerned, and then in the automatic pilot mode of control, the feedback can be used by locking the point of connection of the appropriate differential link to the main actuator which is capable of operation in response to signals from the instrument.

In order to allow operation of the other portions of the control surface if the valve for one portion sticks, a spring can be included in the mechanism for operating each actuator.

The spring could be in the connection between the differential link and the control for the actuator in order not to disturb the mechanical feedback to the manual controller in the automatic pilot mode of operation.

Even if no auto-pilot or other instrument control is used it may be advantageous to have the spring in the connection between the differential link and the control for the actuator, and according to another aspect of the invention a number of parallel actuators are arranged to be controlled from a common input through a differential link providing movement of controls for the actuators in dependence on the difference between the input movement and the actuator output movement as provided one or more feedback connections and a spring or the equivalent allowing movement of the output point of the differential link without corresponding movement of one or more of the actuator controls.

Then if one actuator valve sticks the spring can take up the movement of the differential link.

Preferably there is a differential link for each main actuator and the common input may be a manual controller for moving the control surface.

The invention may be carried into practice in different ways and one embodiment as applied to the control apparatus for the elevator of an aircraft will now be described by way of example with reference to the accompanying drawings of which:

FIGURE 1 is a schematic diagram of the arrangement of the apparatus,
FIGURE 2 is an elevation of a lever mechanism used in the apparatus of FIGURE 1, and
FIGURE 3 is an enlarged side elevation view of the assembly of levers 18, 46 and 47 shown in FIGURE 2.

The control surface is in a number of independently movable portions 11, 12 etc. each of which is actuated to be deflected by a different hydraulic actuator 13, 14 etc. For simplicity only two portions are shown in the drawing.

The system has two modes of operation, a power-assisted manual mode and an automatic pilot mode, and in the power-assisted manual mode the valves 15, 16 etc. of the different actuators are all moved in response to the deflection of a single manual controller 17 through one of a number of differential links 18, 19 etc. of which there is one for each actuator, and thus for each portion of the control surface.

In the automatic pilot mode of control, signals from instruments in an automatic pilot 21 are arranged to operate the valve 16 of one of the actuators 14 only through an auxiliary actuator 22 to deflect the corresponding portion 12 of the control surface in accordance with the signals, and mechanical feed-back from the control surface through the differential link 19 is arranged to move the manual controller 17 to the position corresponding to the position of that portion of the control surface. Once the manual controller moves it will move the other portions 11 etc. of the control surface in the same way as during powered manual control.

The control mechanism for each portion of the control surface will now be described in greater detail.

The differential link e.g. 18 has one end coupled through a common operating rod 25 to the manual controller 17, which is provided with a conventional automatic feel device 26, and has the other end connected through a feedback rod 27 to the appropriate portion of the control surface. An intermediate point on the differential link is coupled through a link 28 with the control valve 15 of the hydraulic actuator 13 whose output is connected through linkage such as 29 to the appropriate portion 11 of the control surface. The link 28 from the intermediate point of the differential link 18 to the control valve 15 includes a spring box 31 by which its length can be varied if the force it is required to transmit exceeds a limit so that even if the actuator control valve for that portion of the control surface sticks, the differential link can be moved by the manual controller 17. In this way the other portions of the control surface can be moved in spite of the sticking of the one actuator control valve.

In the single portion of the control system for operating the portion 12 of the control surface in response to signals from the automatic pilot 21, the input to the control valve 16 of the actuator 14 is obtained through an auxiliary differential link 33 of which the two inputs are connected respectively to the central or output point of the first differential link 19 through the spring box 31, and the ouptut of the auxiliary actuator 22 which is controlled by the automatic pilot. The output of the auxiliary differential link 33 is connected to the control valve 16.

The intermediate or output point of the first differential link 19 in this portion of the system is pivotally mounted upon a slide 35′ which can be locked in a predetermined position during the automatic mode of operation by means of a boss 35 on the slide, and co-operating V-shaped notch 36 which is mounted on a latch 37 which in turn is pivoted about a point 38 fixed to the aircraft. During the automatic mode of operation the latch is moved about its pivot by an actuator 39 to bring the V-shaped notch 36 into contact with the boss 35 on the slide and thus prevent lateral movement of the slide and therefore also of the pivoted output point. In this way the manual controller is rendered incapable of applying an input to the valve 16. If, however, the force tending to move the boss laterally is great enough it can remove the lock by pushing against the inclined side of the V to raise the latch, and then operation reverts to the powered manual mode. When this occuurs movement of the latch 37 closes a switch 41 which renders the automatic pilot inoperative to control the auxiliary actuator 22 so that the upper end of the auxiliary differential link 33 becomes fixed.

During the automatic mode of operation the automatic pilot 21 receives electrical feed-back representing the output of the actuator 14 from the potentiometer 42 mounted on the output shaft through a switch 43 which is open during powered manual operation.

During powered manual operation all the parallel controls work in a similar manner to control the respective portions of the control surface. As the manual controller is moved all the differential links, 18, 19 etc., pivot to move the control valves of the various hydraulic actuators which deflect the different portions of the control surface; mechanical feed-back is obtained through the other end of the rods 27 to restore the control valves to their zero positions. As has already been foreshadowed, should one of the control valves stick, then the movement of the differential link associated with the valve can still take place by compressing the spring in the spring box 31, so that operation of the other differential links is not prevented. If, on the other hand, an actuator sticks, then there will be no feedback from that one actuator, but operation of the other portions of the apparatus can still take place. Thus, although the aircraft can be controlled by only the remaining portions of the control surface, some control will be available.

In this latter mode a limited amount of autostabilisation can be achieved using the one portion of the control surface, with the autopilot maintained in operation but with the output point of link 19 unlocked.

During the automatic mode of operation it is sufficient for the automatic pilot 21 to be used in a single one of the parallel portions of the control apparatus, that is to say, the apparatus controlling a single portion of the control surface, because the feed-back obtained through the differential link 19 in this portion when the output point is locked moves the manual controller 17 to a position corresponding with the position of the control surface portion 12, and this movement of the controller effects the necessary movement of the other portions 11 etc. of the control surface in the manner described for powered manual control.

The preferred arrangement of the differential link will now be described in more detail with reference to FIGURES 2 and 3. The linkage includes the differential link 18 etc., a subsidiary link 46 and an error link 47 arranged generally in line with each other, one above the other. The links 46 and 47 constitute the spring-box link 28 shown diagrammatically in FIGURE 1.

The differential link 18 is connected at one end to the manual control rod 25 and at the other end to the feedback rod 27 which is connected to the piston of the actuator. The actuator body 51 is fixed to the aircraft at one end through a universal joint 52, and has the piston movable and connected at 53 to the link connected to the control surface. The feed-back rod 27 is pivotally connected at 54 to a portion of the piston rod which extends backwards from the body towards the universal joint 52, and access to it is obtained through a slot 55 formed in the connection 56 from the body of the universal joint.

The subsidiary link 46 at one end is pivoted to the pivotal connection between the feed-back rod 27 and the differential link 18, and at the other end, which is at about the mid-point of the differential link, is formed with two oppositely-disposed flanges or ears 57 to accommodate an arcuate slot 58 about the top pivotal connection as centre and extending for perhaps 10° on either side of the centre line of the links. A stud 59 fixed to the differential link runs in this arcuate slot so that relative pivoting is permitted between the differential and subsidiary links 46 and 18 about the pivotal connection to the feedback rod 27.

This movement is, however, restrained by means of a pair of stiff cantilever leaf springs 61 supported one on either side of the differential link at the end where it is connected to the feedback rod, and having pads which press against both the differential link and the subsidiary link tending to keep them together at a point a little further from the pivotal connection to the feed-back link than the boss 59 and the arcuate slot 58.

The error link 47 is pivotally connected to the subsidiary link 46 at the point where the springs act and extends back towards the connection to the feed-back rod where it is connected to the rotary input 62 of the control valve 15 for the actuator 13.

In operation the arrangement acts as a conventional differential link, but the connection to the control valve includes the spring device which allows lateral movement of the mid-point of the differential link, that is to say, the stud 59 in its arcuate slot, instead of causing conseqent movement of the control valve provided that the force resisting movement of the control valve is greater than the force of the springs.

The mid-point of the differential link in the one parallel portion can be locked when required by means of the boss 35 which is mounted coaxially with the pivotal connection between the subsidiary link 46 and the error link 47 and co-operates with the V-shaped groove in the latch 37 already described with reference to FIGURE 1. The load required to release this lock might be about eight times greater than that required to overcome the springs 61.

The apparatus could be modified to allow a 'direct-manual' mode of operation by allowing for release of the pivot on the link 29 and permanently locking the mid-point of the differential link 18 in each channel.

The lost motion spring box connection 31 in the channel controlled by the auto pilot 21 has been shown as positioned between the output point of the differential link 19 and the control valve 16 of the main actuator 14.

The spring itself may be defined as a centralising spring device of the positive centralisation type which does not give until the stress reaches a critical value, and then gives readily to its limiting value without requiring a much greater stress.

Finally one further alternative may be described whereby the auto pilot actuator 22 uses a different control valve for the main actuator 14 and the control valve 16.

What we claim is:

1. Control apparatus for an aircraft having a control surface with a number of independently movable control surface portions comprising a plurality of main actuators each having its own actuator control means, each main actuator being connected to move a different portion of said control surface in dependence upon an input signal applied to its associated control means, means for generating a control signal, an auxiliary actuator responsive to said control signal for controlling the control means of one of said main actuators in accordance therewith, and means responsive to the output of said one main actuator for providing an input signal corresponding to that applied to said main actuator to be applied to said control means of each of said other main actuators.

2. Control apparatus as claimed in claim 1 including a manual controller connected to apply a signal proportional to the deflection thereof simultaneously to all of said actuator control means.

3. Control apparatus for an aircraft having a control surface with a number of independently movable control surface portions comprising a number of main actuators each having its own actuator control means, each main actuator being connected to move a different portion of said control surface in dependence upon an input signal applied to its associated control means, a manual controller connected to apply mechanical input signals simultaneously to all of said actuator control means in accordance with the displacement of said manual controller, means for generating a control signal, an auxiliary actuator responsive to said control signal for applying an input signal to the actuator control means of one only of said main actuators, and means responsive to the output of said one main actuator for moving said manual controller to a position corresponding with the position of said one main actuator including means associated with said manual controller for applying mechanical input signals corresponding with the position of said one main actuator to all of said actuator control means other than the actuator control means of said one main actuator.

4. Control apparatus as claimed in claim 3 including a plurality of mechanical differentials, each of said actuator control means being responsive to the output of a particular mechanical differential, the inputs of each of said differentials being connected to said manual controller and to the output of the corresponding main actuator.

5. Control apparatus as claimed in claim 4 in which the mechanical differential associated with the actuator control means of said one main actuator is a differential lever having an input point and an output point and means including a locking device for locking the output point of said differential lever in a predetermined position, whereby, when locked, said differential lever pivots about said output point.

6. Control apparatus as claimed in claim 5 wherein said locking device includes means for overriding said locking device when a certain level of force is applied thereto.

7. Control apparatus as claimed in claim 4 including a transmission system including resilient means connected between at least one of the actuator control means and the output of its associated mechanical differential for permitting displacement of the output of said mechanical differential without the application of a corresponding displacement signal to said actuator control means when the resistance developed by the control means to the said displacement signal is in excess of a predetermined amount.

8. Control apparatus for an aircraft having a control surface with two movable control surface portions comprising two hydraulic actuators, each portion of said control surface being connected to be moved by a different hydraulic actuator, each of said actuators having an actuator control means including a valve provided with first and second valve portions, the relative positions of said first and second valve portions determining the flow of hydraulic fluid to and from the associated hydraulic actuator, a manual controller for providing a first input displacement signal, means for providing a second input displacement signal dependent upon the position of one of said hydraulic actuators, a mechanical differential responsive to said first and second input displacement signals for providing an output displacement signal dependent upon the difference between said first and second signals, and transmission means for applying said output displacement signal to change the relative positions of said valve portions of the other valve, one of said transmission means including resilient means for yielding when a resistance to the relative movement of said valve portions of the corresponding valve is developed in excess of a predetermined amount thereby permitting output displacement of the corresponding mechanical differential without relative movement of said valve portions developing the resistance.

9. Control apparatus as claimed in claim 8 in which said resilient means includes spring means having first and second elements through which are transmitted the movements of said transmission means, said elements being movable with respect to one another while maintained in a fixed relative position by said spring means, said spring means being arranged to yield a substantial amount when the force applied thereto by said elements as a result of movement being applied to said transmission means is greater than a predetermined amount.

References Cited in the file of this patent

UNITED STATES PATENTS

| | | |
|---|---|---|
| 2,430,808 | Eaton | Nov. 11, 1947 |
| 2,597,361 | Mott | May 20, 1952 |
| 2,739,771 | Meredith | Mar. 27, 1956 |

FOREIGN PATENTS

| | | |
|---|---|---|
| 540,211 | Great Britain | Oct. 9, 1941 |